(12) United States Patent
Chaudhry et al.

(10) Patent No.: US 6,415,356 B1
(45) Date of Patent: Jul. 2, 2002

(54) METHOD AND APPARATUS FOR USING AN ASSIST PROCESSOR TO PRE-FETCH DATA VALUES FOR A PRIMARY PROCESSOR

(75) Inventors: Shailender Chaudhry, San Francisco; Marc Tremblay, Menlo Park, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/565,637

(22) Filed: May 4, 2000

Related U.S. Application Data
(60) Provisional application No. 60/176,235, filed on Jan. 14, 2000.

(51) Int. Cl.[7] .............................. G06F 9/38; G06F 9/45
(52) U.S. Cl. ................... 711/118; 711/130; 711/137; 712/207; 717/6
(58) Field of Search ............................ 711/118, 137, 711/130; 712/205, 207, 225, 237, 240; 717/6; 700/2, 3, 4, 5; 709/208; 345/505

(56) References Cited

U.S. PATENT DOCUMENTS

| | | | | |
|---|---|---|---|---|
| 4,991,080 A | * | 2/1991 | Emma et al. | ............... 712/206 |
| 5,392,391 A | * | 2/1995 | Caulk, Jr.et al. | ............ 345/503 |
| 5,787,285 A | | 7/1998 | Lanning | ..................... 395/704 |

FOREIGN PATENT DOCUMENTS

| | | | |
|---|---|---|---|
| WO | 96/20440 | * 4/1996 | |
| WO | WO 96/20440 | 7/1996 | ............. G06F/9/38 |

OTHER PUBLICATIONS

Publication entitled, "Storage Hierarchy Control System" by Sakalay. IBM Technical Disclosure Bullentin, vol. 15, No. 4, Sep. 1972, pp. 1100–1101; XP 002002415; G06F 12/08.

Publication entitled, "Code Generation for Streaming: an Access/Execute Mechanism" by Manuel E. Benitez and Jack W. Davidson of the Department of Computer Science at the University of Virginia Charlottesville, VA 22903; 8345 Computer Architecture News 19 (1991) Apr., No. 2, New York, USA, pp. 132–141.

* cited by examiner

*Primary Examiner*—Do Hyun Yoo
*Assistant Examiner*—Yamir Encarnación
(74) *Attorney, Agent, or Firm*—Park, Vaughan & Fleming LLP

(57) ABSTRACT

One embodiment of the present invention provides a system that prefetches from memory by using an assist processor that executes in advance of a primary processor. The system operates by executing executable code on the primary processor, and simultaneously executing a reduced version of the executable code on the assist processor. This reduced version runs more quickly than the executable code, and generates the same pattern of memory references as the executable code. This allows the assist processor to generate the same pattern of memory references that the primary processor generates in advance of when the primary processor generates the memory references. The system stores results of memory references generated by the assist processor in a store that is shared with the primary processor so that the primary processor can access the results of the memory references. In one embodiment of the present invention, this store is a cache memory. In one embodiment of the present invention, prior to executing the executable code, the system compiles source code into the executable code for the primary processor. The system also produces the reduced version of the executable code for the assist processor from the executable code by eliminating instructions from the executable code that have no effect on a pattern of memory references generated by the executable code.

27 Claims, 3 Drawing Sheets

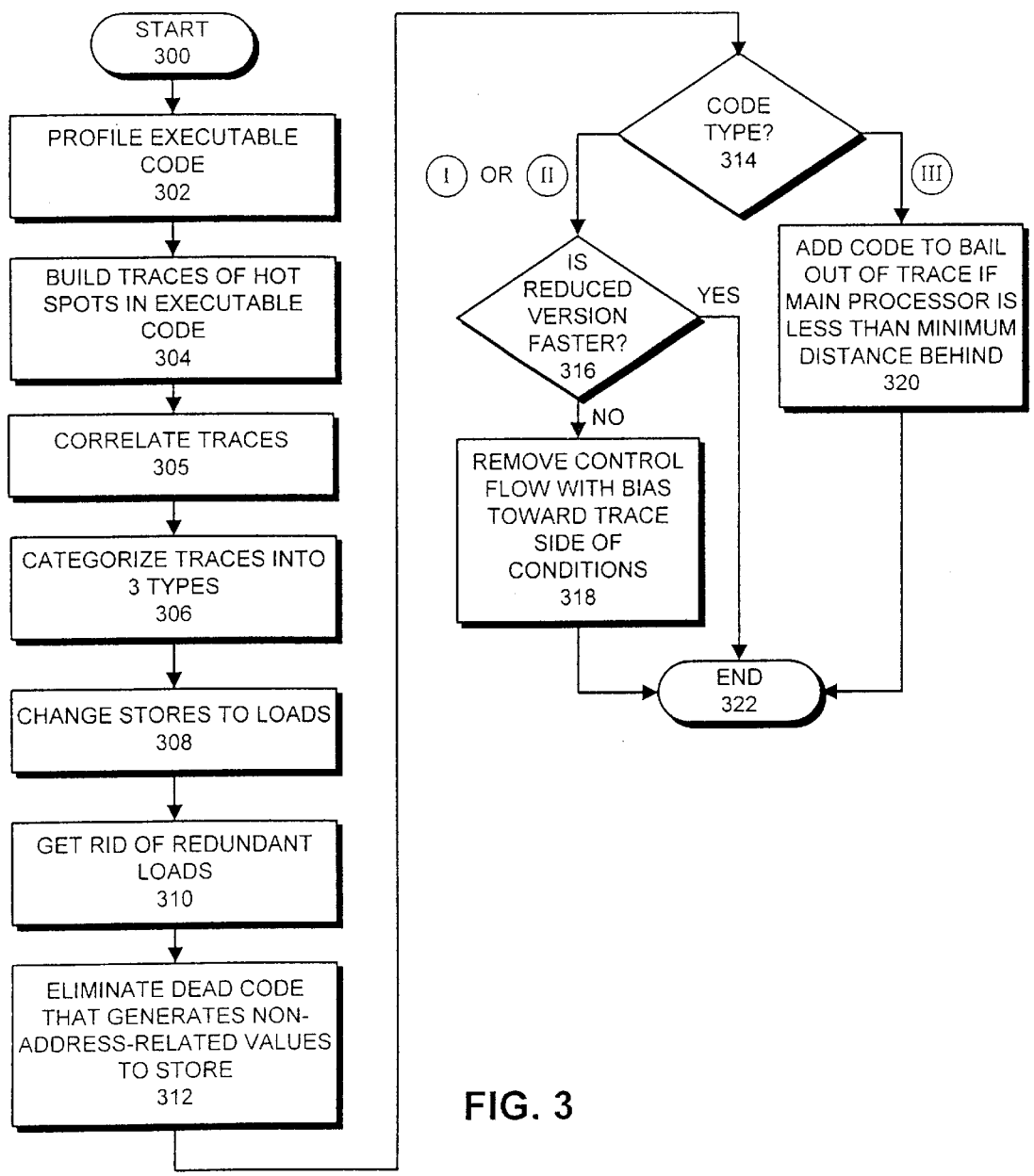

METHOD AND APPARATUS FOR USING AN ASSIST PROCESSOR TO PRE-FETCH DATA VALUES FOR A PRIMARY PROCESSOR

RELATED APPLICATION

This application hereby claims priority under 35 U.S.C. §119 to Provisional Patent Application No. 60/176,235 filed on Jan. 14, 2000.

BACKGROUND

1. Field of the Invention

The present invention relates to techniques for improving computer system performance. More specifically, the present invention relates to a method and an apparatus for prefetching data and/or instructions from memory by using an assist processor that executes in advance of a primary processor.

2. Related Art

As increasing semiconductor integration densities allow more transistors to be integrated onto a microprocessor chip, computer designers are investigating different methods of using these transistors to increase computer system performance. To this end, computer designers are beginning to incorporate multiple central processing units (CPUs) into a single semiconductor chip. This can result in performance gains for computational tasks that can be parallelized (divided) into separate pieces that can be concurrently executed.

Unfortunately, performance gains from parallelization can be limited for many applications that contain inherently serial portions of code. For these inherently serial portions of code, performance is further limited by memory latency problems.

Memory latency problems are growing progressively worse as processor clock speeds continue to improve at an exponential rate. At today's processor clock speeds, it can take as many as 100 processor clock cycles to pull a cache line in from main memory.

Computer designers presently use a number of techniques to decrease memory latency delays. (1) Out-of-order execution can be used to schedule loads and stores so that memory latency is hidden as much as possible. Unfortunately, out-of-order execution is typically limited to hiding a few clock cycles of memory latency. (2) A non-faulting load instruction can be used to speculatively load a data value, without causing a miss when the address is not valid. (3) A steering load instruction can be used to speculatively load a data value into L2 cache, but not L1 cache, so that L1 cache is not polluted by unused data values. Unfortunately, using non-faulting loads and steering loads can result in unnecessary loads. This wastes instruction cache space and ties up registers. (4) Some researchers have investigated using hardware prefetch engines, but these hardware prefetch engines are typically ineffective for irregular memory access patterns.

What is needed is a method and an apparatus that reduces memory latency delays in fast processor systems without the limitations and costs involved in using the above-discussed techniques.

SUMMARY

One embodiment of the present invention provides a system that prefetches from memory by using an assist processor that executes in advance of a primary processor.

The system operates by executing executable code on the primary processor, and simultaneously executing a reduced version of the executable code on the assist processor. This reduced version runs more quickly than the executable code, and generates the same pattern of memory references as the executable code. This allows the assist processor to generate the same pattern of memory references that the primary processor generates in advance of when the primary processor generates the memory references. The system stores results of memory references generated by the assist processor in a store that is shared with the primary processor so that the primary processor can access the results of the memory references. In one embodiment of the present invention, this store is a cache memory.

In one embodiment of the present invention, prior to executing the executable code, the system compiles source code into the executable code for the primary processor. The system also produces the reduced version of the executable code for the assist processor from the executable code for the primary processor by eliminating instructions from the executable code that have no effect on a pattern of memory references generated by the executable code.

In one embodiment of the present invention, producing the reduced version of the executable code involves converting load instructions into corresponding tore instructions, eliminating redundant load instructions directed to previously loaded cache lines, and eliminating code that is used to calculate store values that are not used in determining address reference patterns.

In one embodiment of the present invention, the system profiles the executable code to create instruction traces for hot spots in the executable code, and then filters the instruction traces to produce the reduced version of the executable code.

In one embodiment of the present invention, the processes of compiling the source code and producing the reduced version of the executable code are carried out by a compiler.

In one embodiment of the present invention, the system periodically sends progress indicators from the primary processor to the assist processor through a one-way communication channel. In a variation on this embodiment, the system stops execution of the assist processor if the assist processor is less than a minimum number of instructions ahead of the primary processor.

In one embodiment of the present invention, the reduced version of the executable code is modified to speculatively execute code down a branch path that is more frequently taken if the reduced version of the executable code is determined to be not significantly faster than the executable code.

In one embodiment of the present invention, the store includes a data cache that is shared by the primary processor and the assist processor.

In one embodiment of the present invention, the store includes an instruction cache that is shared by the primary processor and the assist processor.

In one embodiment of the present invention, the store includes a branch history table that is shared by the primary processor and the assist processor.

In one embodiment of the present invention, the primary processor and the assist processor reside on the same semiconductor chip.

In one embodiment of the present invention, the primary processor and the assist processor reside on distinct semiconductor chips.

BRIEF DESCRIPTION OF THE FIGURES

FIG. 2 illustrates the compilation process in accordance with an embodiment of the present invention.

FIG. 3 is a flow chart illustrating the process of generating the reduced version of the executable code in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
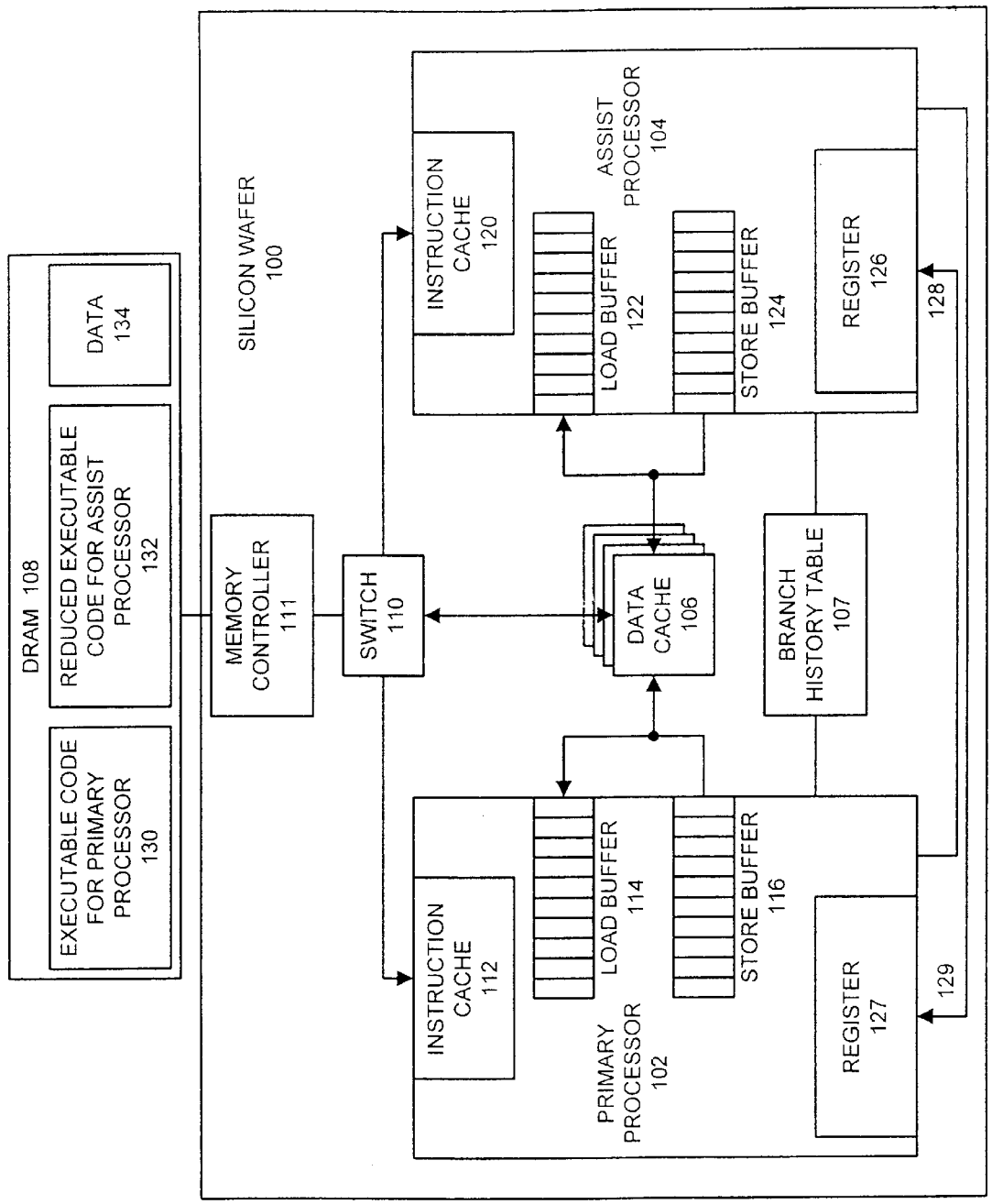
FIG. 1 illustrates a computer system in accordance with an embodiment of the present invention.

FIG. 1 illustrates a computer system in accordance with an embodiment of the present invention. This computer system includes a primary processor 102 and an assist processor 104, which share a common data cache 106. All of these structures reside on silicon die 100 (although in other embodiments of the present invention they can reside on multiple silicon dies). Note that processors 102 and 104 may generally include any type of computational devices.

Processors 102 and 104 include instruction caches 112 and 120, respectively, which contain instructions to be executed by processors 102 and 104.

Processors 102 and 104 additionally include load buffers 114 and 122 as well as store buffers 116 and 124 for buffering communications with data cache 106. More specifically, primary processor 102 includes load buffer 1 14 for buffering loads received from data cache 106, and store buffer 116 for buffering stores to data cache 106. Similarly, assist processor 104 includes load buffer 122 for buffering loads received from data cache 106, and store buffer 124 for buffering stores to data cache 106.

Processors 102 and 104 are additionally coupled together by one-way communication channels 128–129, which facilitates rapid communication between primary processor 102 and assist processor 104. Note that communication channel 128 allows primary processor 102 to write into register 126 within assist processor 104, and that communication channel 129 allows assist processor 104 to write into register 127 within primary processor 102.

Unlike using shared memory communication mechanisms, writing into register 126 (or 127) will not cause a cache miss. Furthermore, primary processor 102 does not have to wait until assist processor 104 receives the communication. Note that if primary processor 102 were to communicate with assist processor 104 through memory, the system would have to wait for store buffer 116 to be cleared in order to communicate.

In the embodiment illustrated in FIG. 1, data cache 106 is fully dual-ported, thereby allowing concurrent read and/or write accesses from processors 102 and 104. This dual porting eliminates cache coherence delays associated with conventional shared memory architectures that rely on coherent caches.

In one embodiment of the present invention, data cache 106 is a 16K-byte 4-way set-associative data cache with 32 byte cache lines.

Data cache 106, instruction cache 112 and instruction cache 120 are coupled through switch 110 to memory controller 111. Memory controller 111 is coupled to dynamic random access memory (DRAM) 108, which is located off chip. Switch 110 may include any type of circuitry for switching signal lines. In one embodiment of the present invention, switch 110 is a cross bar switch.

DRAM 108 contains executable code 130 for primary processor 102. During system operation executable code 130 is loaded through memory controller 111 and switch 110 into instruction cache 112 of primary processor 102. DRAM 108 also contains reduced executable code 132 for assist processor 104. Reduced executable code 132 is a reduced version of executable code 130 that generates the same pattern of memory references as executable code 130. During system operation, reduced executable code 132 is loaded through memory controller 111 and switch 110 into instruction cache 120 of assist processor 104. DRAM 108 additionally contains data 134 that is moved to and from data cache 106 through memory controller 111 and switch 110.

Note that the present invention can be used in any computer system that includes multiple processors and is not limited to the illustrated computing system structure.

Also note that in one embodiment of the present invention, assist processor 104 is used to make data accesses in advance of when the data is used by primary processor 102. In this embodiment, assist processor 104 does not have to actually perform the computations specified in a program; assist processor 104 merely has to perform sufficient computations to allow assist processor 104 to determine the memory access pattern of the program. Hence, assist processor 104 can be a much simpler version of primary processor 104, without circuitry that is not required to perform address computations, such as arithmetic circuitry.

Compilation Process

FIG. 2 illustrates the compilation process in accordance with an embodiment of the present invention. During the compilation process, source code 202 feeds through compiler 204 to produce executable code 130 for primary processor 102. Executable code 130 then feeds through reduction module 208 to produce reduced executable code 132 for assist processor 104. Note that reduction module 208 may be part of compiler 204, or alternatively, may be separate from compiler 204.

In one embodiment of the present invention, the compilation and reduction processes take place before run-time. In another embodiment, the compilation and reduction processes take place during run-time, while the program is executing.

Generating Reduced Executable Code

FIG. 3 is a flow chart illustrating the process of generating reduced executable code 132 within reduction module 208 in accordance with an embodiment of the present invention. The system starts by profiling (simulating execution of) executable code 130 to identify hot spots in which load latency is causing delays (step 302). Next, the system builds instruction traces of the hot spots in executable code 130 (step 304). In one embodiment of the present invention, the system constructs about 100 dispersed traces of about 2000 instructions each. The system then correlates this trace back to the source code (step 305).

Next, the system categorizes traces into three types (step 306). In a type one trace, the address stream is not dependent on loaded data. For example, the pattern of data references in the code fragment below is not dependent on the value of the data loaded.

for(i=0; i<100; i++){
        rnd=generateRandomint( );
        index1=function1(rnd);
        index2=function2(rnd);
        B[index1]^=A[index2];
    }

In a type two trace, the value of loaded data affects control flow only, but not the next address. In other words, if a load happens it will be to the next address. However, due to control flow variations, the load may not happen. For example, in the code fragment below, if the hash table entry is found, the variable "found" will be set to I. Otherwise, the variable "found" is not modified.

while (hashTable[I] >0){
        if (hashTable[I] ==entry){ found=I; break;
        }
        I-=disp;
        if(I<0) I+=hashTableSize;
    }

In a type three trace, the value loaded affects both the next address and control flow. For example, a piece of code that searches down a linked list is a type three trace because a pointer value loaded from a linked list node determines the address of the next node in the linked list.

Next the system modifies the traces to reduce the number of instructions in the traces while preserving the pattern of memory references generated by the traces. In doing so, the system presumes live variables are stored in registers. The first step is to change stores to loads (step 308). Note that the immediate effect of a store instruction is to pull a target cache line into data cache 106, which is the same as the effect of a load instruction. Hence, substituting a load instruction for a store instruction does not affect the memory reference pattern of the program.

This involves determining which load instructions are directed to the same cache line and getting rid of any load instructions that are directed to a cache line that has been previously loaded by a preceding load instruction.

The third step is to eliminate dead code (step 312). This dead code includes code for generating values for store instructions that were changed to load instructions. For example, code on different sides of a branch often generate the same address streams but perform different calculations. In this case, when a store is changed to a load, the branch is not needed (nor is the compare to set the branch condition) and only code on one side of the branch is included in reduced executable code 132.

Also note that for type three traces, store instructions which store values that influence subsequent address calculations are not changed. These values are calculated and stored in registers to enable the system to follow subsequent address calculations.

Next, the system performs different actions for different types of traces. For a type one or type two trace, the system estimates if the reduced executable code 132 is faster than the original executable code 130 assuming that reduced executable code 132 will encounter only cache misses during load instructions, and assuming executable code 130 will encounter only cache hits (step 316). If reduced executable code 132 is faster, the process is complete. Otherwise, the system removes control flow instructions (e.g., branches) with a bias toward the most frequently taken branch paths as is determined during the profiling process (step 318). In doing so, reduced executable code 132 effectively speculates on the outcome of conditional branch instructions in order to gain more speed.

For type three traces, the system adds code to both executable code 130 and reduced executable code 132 that allows assist processor 104 to detect if assist processor 104 is less than a minimum number of instructions ahead of primary processor 102, and if so to bail out of executing the trace (step 320). Note that communications from primary processor 102 to assist processor 104 take place through the one-way communication channel 128.

Concurrent Execution

Figure 4:
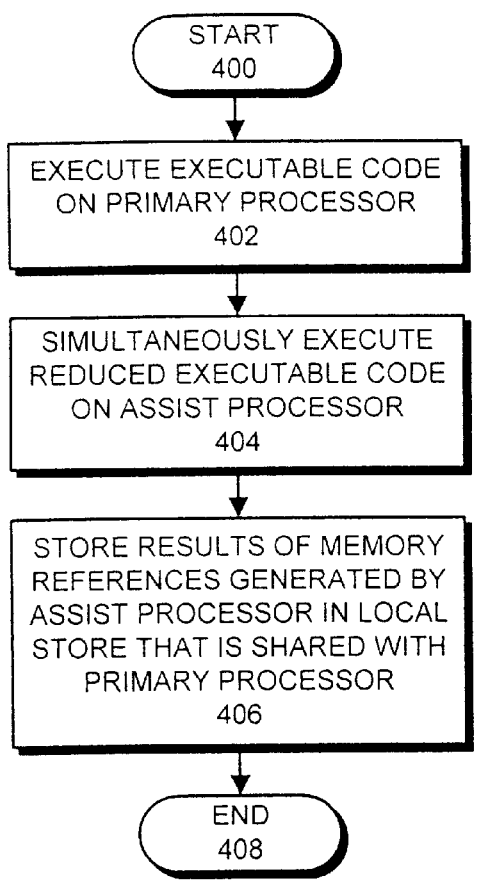
FIG. 4 is a flow chart illustrating the process of concurrently executing the executable code and the reduced executable code in accordance with an embodiment of the present invention.

FIG. 4 is a flow chart illustrating the process of concurrently executing executable code 130 and reduced executable code 132 in accordance with an embodiment of the present invention. The system starts by executing executable code 130 on primary processor 102 (step 402). The system also concurrently executes reduced executable code 132 on assist processor 104 (step 404). When results of memory references generated by assist processor 104 return from memory, they are stored in data cache 106, which is shared with primary processor 102 (step 406). This allows primary processor 102 to reference the pre-fetched data values from data cache 106 without having to wait for the data values to be fetched from DRAM 108.

Operation of Assist Processor

Figure 5:
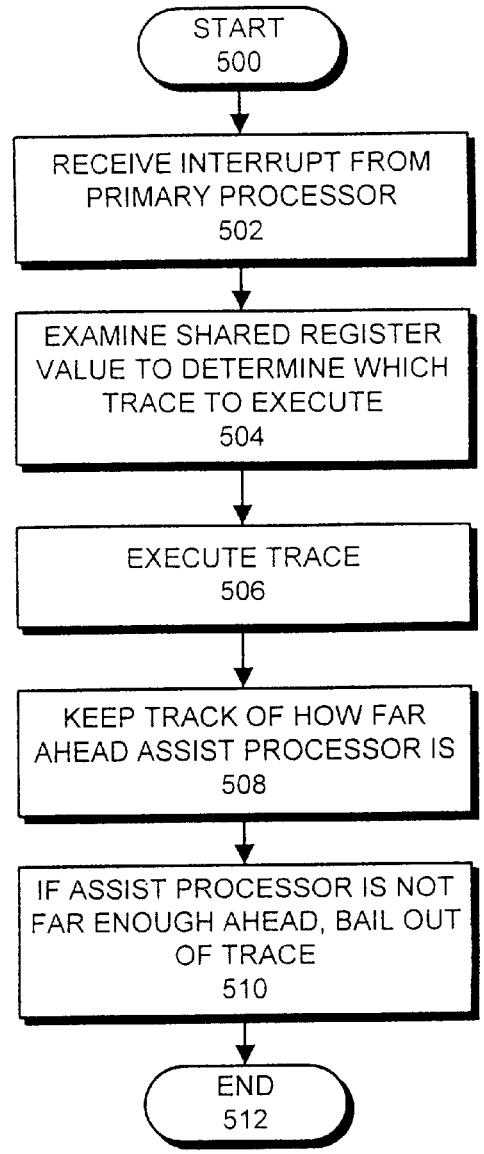
FIG. 5 is a flow chart illustrating operation of the assist processor in accordance with an embodiment of the present invention.

FIG. 5 is a flow chart illustrating in more detail the operation of assist processor 104 in accordance with an embodiment of the present invention. Assist processor 104 first receives an interrupt from primary processor 102 (step 502). This causes assist processor 104 to examine a shared register value to determine which trace to execute (step 504). This implicitly presumes primary processor writes a trace identifier to the shared register, and then sends an interrupt to assist processor 104. Primary processor 102 attempts to send the interrupt to assist processor 104 as soon as all the live values of executable code 130 are known and are loaded into registers in primary processor 102. In one embodiment of the present invention, the a compiler within the system moves code around to calculate the live values as soon as possible.

After receiving the interrupt, assist processor 104 executes the designated trace (step 506).

During trace execution, assist processor 104 keeps track of how far ahead of primary processor 102 it is (step 508). This is accomplished by primary processor 102 periodically sending progress indicators to assist processor 104 through communication channel 128.

If assist processor 104 is not a minimum number of instructions ahead of primary processor 102 during a type three trace, assist processor 104 bails out of the trace and waits for primary processor 102 to specify another trace (step 510). In some cases, this allows assist processor 104 to begin executing the next trace prior to primary processor 102 completing the previous trace.

Note that although the present invention is described in terms of a shared data cache 106, the present invention can generally be applied to any type of system in which processors share information retrieved from memory. In one embodiment of the present invention, processors 102 and 104 share an instruction cache. In another embodiment, processors 102 and 103 share a branch history table 107.

Also note that the term "shared cache" as used in this patent application can refer to systems in which processors 102 and 104 contain separate local caches containing mirrored copies of the same data. In this case, a load from memory into the local cache of assist processor 104 causes a corresponding load to the local cache of primary processor 102.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for prefetching from memory by using an assist processor that executes in advance of a primary processor, comprising:
    compiling source code into primary processor executable code for the primary processor;
    producing the reduced version of the executable code for the assist processor from the executable code for the primary processor by eliminating instructions from the executable code that have no effect on a pattern of memory references generated by the executable code;
    executing executable code on the primary processor;
    simultaneously executing a reduced version of the executable code on the assist processor, wherein the reduced version of the executable code executes more quickly than the executable code, and generates the same pattern of memory references as the executable code, so that the assist processor generates the same pattern of memory references that the primary processor generates in advance of when the primary processor generates the memory references; and
    storing results of memory references generated by the assist processor into a store that is shared with the primary processor so that the primary processor is able to access the results of the memory references.

2. The method of claim 1, wherein producing the reduced version of the executable code involves:
    converting store instructions into corresponding load instructions;
    eliminating redundant load instructions directed to previously loaded cache lines; and
    eliminating code that is used to calculate store values that are not subsequently used in determining address reference patterns for the executable code for the primary processor.

3. The method of claim 1, further comprising profiling the executable code to create instruction traces for hot spots in the executable code; and
    wherein producing the reduced version of the executable code involves modifying the instruction traces for the hot spots in the executable code.

4. The method of claim 1, wherein the processes of compiling the source code and producing the reduced version of the executable code are carried out by a compiler.

5. The method of claim 1, further comprising periodically sending progress indicators from the primary processor to the assist processor through a one-way communication channel.

6. The method of claim 5, further comprising stopping execution of the assist processor if the assist processor is less than a minimum number of instructions ahead of the primary processor.

7. The method of claim 1, wherein the reduced version of the executable code is modified to speculatively execute code down a branch path that is more frequently taken if the reduced version of the executable code is previously determined to be not faster than the executable code.

8. The method of claim 1, wherein the primary processor and the assist processor reside on the same semiconductor chip.

9. The method of claim 1, wherein the primary processor and the assist processor reside on distinct semiconductor chips.

10. The method of claim 1, wherein the assist processor is a simplified version of the primary processor, without circuitry that is not required to perform address computations.

11. A computer-readable storage medium storing instructions that when executed by a computer cause the computer to perform a method for prefetching from memory by using an assist processor that executes in advance of a primary processor, the method comprising:
    compiling source code into the executable code for the primary processor;
    producing the reduced version of the executable code for the assist processor from the executable code by eliminating instructions from the executable code for the primary processor that have no effect on a pattern of memory references generated by the executable code;
    executing executable code on the primary processor;
    simultaneously executing a reduced version of the executable code on the assist processor, wherein the reduced version of the executable code executes more quickly than the executable code, and generates the same pattern of memory references as the executable code, so that the assist processor generates the same pattern of memory references that the primary processor generates in advance of when the primary processor generates the memory references; and
    storing results of memory references generated by the assist processor into a store that is shared with the primary processor so that the primary processor is able to access the results of the memory references.

12. The computer-readable storage medium of claim 11, wherein producing the reduced version of the executable code involves:
    converting store instructions into corresponding load instructions;

getting rid of redundant load instructions directed to previously loaded cache lines; and eliminating code that is used to calculate store values that are not subsequently used in determining address reference patterns for the executable code.

13. The computer-readable storage medium of claim 11, wherein the method further comprises profiling the executable code to create instruction traces for hot spots in the executable code; and wherein producing the reduced version of the executable code involves modifying the instruction traces for the hot spots in the executable code.

14. The computer-readable storage medium of claim 11, wherein the method further comprises periodically sending progress indicators from the primary processor to the assist processor through a one-way communication channel.

15. The computer-readable storage medium of claim 11, wherein the reduced version of the executable code is modified to speculatively execute code down a branch path that is more frequently taken if the reduced version of the executable code is determined to be not faster than the executable code.

16. An apparatus that facilitates pre-fetching from memory, comprising:

a primary processor that is configured to execute executable code;

an assist processor that is configured to simultaneously execute a reduced version of the executable code, wherein the reduced version of the executable code executes more quickly than the executable code, and generates the same pattern of memory references as the executable code, so that the assist processor generates the same pattern of memory references that the primary processor generates in advance of when the primary processor generates the memory references;

a compilation mechanism that is configured to:
  compile source code into the executable code for the primary processor; and to
  produce the reduced version of the executable code for the assist processor from the executable code for the primary processor by eliminating instructions from the executable code that have no effect on a pattern of memory references generated by the executable code; and a store that is configured to store results of memory references generated by the assist processor;

wherein the store is configured to be shared between the assist processor and the primary processor, so that the primary processor is able to access the results of the memory references generated by the assist processor.

17. The apparatus of claim 16, wherein producing the reduced version of the executable code involves:

converting store instructions into corresponding load instructions;

eliminating redundant load instructions directed to previously loaded cache lines; and eliminating code that is used to calculate store values that are not subsequently used in determining address reference patterns for the executable code.

18. The apparatus of claim 16, wherein the compilation mechanism is additionally configured to profile the executable code to create instruction traces for hot spots in the executable code; and wherein the compilation mechanism produces the reduced version of the executable code by modifying the instruction traces for the hot spots in the executable code.

19. The apparatus of claim 16, further comprising a monitoring mechanism including a one-way communication channel that is configured to send progress indicators from the primary processor to the assist processor.

20. The apparatus of claim 19, further comprising a termination mechanism that is configured to stop execution of the assist processor if the assist processor is less than a minimum number of instructions ahead of the primary processor.

21. The apparatus of claim 16, wherein the reduced version of the executable code is modified to speculatively execute code down a branch path that is more frequently taken if the reduced version of the executable code is determined to be not faster than the executable code.

22. The apparatus of claim 16, wherein the store includes a data cache that is shared by the primary processor and the assist processor.

23. The apparatus of claim 16, wherein the store includes an instruction cache that is shared by the primary processor and the assist processor.

24. The apparatus of claim 16, wherein the store includes a branch history table that is shared by the primary processor and the assist processor.

25. The apparatus of claim 16, wherein the primary processor and the assist processor reside on the same semiconductor chip.

26. The apparatus of claim 16, wherein the primary processor and the assist processor reside on distinct semiconductor chips.

27. The apparatus of claim 16, wherein the assist processor is a simplified version of the primary processor, without circuitry that is not required to perform address computations.

* * * * *